United States Patent
Asaumi et al.

(10) Patent No.: US 7,257,475 B2
(45) Date of Patent: Aug. 14, 2007

(54) VEHICLE CONTROL SYSTEM

(75) Inventors: Hisao Asaumi, Saitama (JP); Masaaki Kawano, Saitama (JP); Osamu Tsurumiya, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 406 days.

(21) Appl. No.: 10/884,013

(22) Filed: Jul. 2, 2004

(65) Prior Publication Data
US 2005/0038585 A1 Feb. 17, 2005

(30) Foreign Application Priority Data
Jul. 14, 2003 (JP) ............................. 2003-196299

(51) Int. Cl.
*B62D 5/04* (2006.01)
(52) U.S. Cl. ...................................... 701/43
(58) Field of Classification Search .................. 701/43
See application file for complete search history.

(56) References Cited
U.S. PATENT DOCUMENTS
2002/0177931 A1* 11/2002 Iwasaki et al. ............... 701/36

FOREIGN PATENT DOCUMENTS
JP 10-226341 8/1998
JP 11-005550 1/1999

* cited by examiner

*Primary Examiner*—Thu V. Nguyen
(74) *Attorney, Agent, or Firm*—Carrier, Blackman & Associates, P.C.; Joseph P. Carrier; William D. Blackman

(57) ABSTRACT

A vehicle control system is provided for a vehicle that is steered by steer-by-wire, the system including a battery mounted in the vehicle, a steer-by-wire steering system that turns wheels by an electric motor that is operated by electric power supplied from the battery, a steering controller for controlling the operation of the steer-by-wire steering system, and an engine controller for controlling, by electric power supplied from the battery, the operation of an engine for making the vehicle travel. A booster circuit boosts the voltage applied to the steering controller so that, when the voltage of the battery decreases, the voltage applied to the engine controller falls below its minimum operating voltage before the voltage applied to the steering controller falls below its minimum operating voltage. With this arrangement, it is possible to provide fail-safe operation when there is a decrease in the voltage of the battery which supplies electricity to the steering controller.

17 Claims, 3 Drawing Sheets

VEHICLE CONTROL SYSTEM

CROSS-REFERENCE TO RELATED APPLICATION(S)

The present invention claims priority under 35 USC 119 based on Japanese patent application No. 2003-193299, filed Jul. 14, 2003.

BACKGROUND OF THE INVENTION

1. Field of the Invention

The present invention relates to a vehicle control system that includes a battery mounted in a vehicle, an electrically operated device that is operated by electric power supplied from the battery and drives a critical system of the vehicle, electrically operated device control means for controlling the operation of the electrically operated device, and engine control means for controlling, by electric power supplied from the battery, the operation of an engine for making the vehicle travel.

2. Description of the Related Art

Japanese Patent Application Laid-open No. 11-5550 and Japanese Patent No. 3364673 disclose steer-by-wire (SBW) steering systems in which mechanical connection between a steering wheel and a steering gearbox is absent, and steering control means controls the drive of an electric motor provided in the steering gearbox based on an electrical signal generated by operation of the steering wheel, thereby turning left and right wheels.

However, because mechanical connection between the steering wheel and the steering gearbox is absent in the steer-by-wire steering system and the wheels are turned by driving the steering gearbox by the driving force of the electric motor which employs a battery as a power source, if the voltage of the battery that supplies electricity to the steering control means decreases, appropriate turning of the wheels may become impossible.

SUMMARY OF THE INVENTION

The present invention has been achieved under the above-mentioned circumstances, and it is an object thereof to provide fail-safe operation when there is a decrease in the voltage of a battery that supplies electricity to an electrically operated device that drives a critical system of the vehicle.

In order to accomplish this object, in accordance with a first aspect of the present invention, there is proposed a vehicle control system comprising: a battery mounted in a vehicle; an electrically operated device that is operated by electric power supplied from the battery and drives a critical system of the vehicle; electrically operated device control means for controlling the operation of the electrically operated device; and engine control means for controlling, by electric power supplied from the battery, the operation of an engine for making the vehicle travel, wherein the vehicle control system further comprises a booster circuit that boosts the voltage applied to the electrically operated device control means so that, when the voltage of the battery decreases, the voltage applied to the engine control means falls below a minimum operating voltage of the engine control means before the voltage applied to the electrically operated device control means falls below a minimum operating voltage of the electrically operated device control means.

With this arrangement, when the voltage of the battery that supplies electric power to the electrically operated device control means and the engine control means decreases, the voltage applied to the electrically operated device control means is boosted by the booster circuit so that the voltage applied to the engine control means falls below its minimum operating voltage before the voltage applied to the electrically operated device control means falls below its minimum operating voltage. Therefore, it is possible to ensure the safety of the vehicle by stopping the engine before the electrically operated device control means becomes inoperable due to the decrease in voltage. Furthermore, such a voltage decrease is often caused by malfunction of a power generation system, but because the engine is stopped, electric power that would have been consumed by the engine control means can be distributed to the electrically operated device control means, so that the function of the critical system of the vehicle can be maintained for as long as possible.

Furthermore, in accordance with a second aspect of the present invention, there is proposed a vehicle control system comprising: a battery mounted in a vehicle; an electrically operated device that is operated by electric power supplied from the battery and drives a critical system of the vehicle; electrically operated device control means for controlling the operation of the electrically operated device; and engine control means for controlling, by electric power supplied from the battery, the operation of an engine for making the vehicle travel, wherein the vehicle control system further comprises minimum operating voltage increasing means that makes a minimum operating voltage of the engine control means higher than a minimum operating voltage of the electrically operated device control means after the engine control means has started.

With this arrangement, the minimum operating voltage increasing means makes the minimum operating voltage of the engine control means higher than the minimum operating voltage of the electrically operated device control means after the engine control means has started. Therefore, during a process in which the battery voltage decreases, the voltage first falls below the minimum operating voltage of the engine control means to stop the engine, that is, it is possible to ensure the safety of the vehicle by stopping the engine before the battery voltage further decreases and the electrically operated device control means becomes inoperable due to the voltage decrease. Moreover, because the engine is stopped, the electric power that would have been consumed by the engine control means can be distributed to the electrically operated device control means, so that the function of the critical system of the vehicle can be maintained for as long as possible.

Moreover, in accordance with a third aspect of the present invention, there is proposed a vehicle control system comprising: a battery mounted in a vehicle; an electrically operated device that is operated by electric power supplied from the battery and drives a critical system of the vehicle; electrically operated device control means for controlling the operation of the electrically operated device; and engine control means for controlling, by electric power supplied from the battery, the operation of an engine for making the vehicle travel, wherein the vehicle control system further comprises battery voltage monitoring means for monitoring the voltage of the battery, and the battery voltage monitoring means stops the supply of electricity to the engine control means when the voltage of the battery decreases, e.g., below a predetermined threshold level.

With this arrangement, when the voltage of the battery that supplies electric power to the electrically operated device control means and the engine control means decreases, the battery voltage monitoring means stops the supply of electricity to the engine control means. Therefore, it is possible to ensure the safety of the vehicle by stopping the engine before the electrically operated device control means becomes inoperable due to the decrease in voltage. Moreover, because the engine is stopped, the electric power that would have been consumed by the engine control means can be distributed to the electrically operated device control means, and the function of the critical system of the vehicle can be maintained for as long as possible.

A steer-by-wire steering system 11 of embodiments disclosed herein corresponds to the critical system of the present invention, an electric motor 12 of the embodiments corresponds to the electrically operated device of the present invention, and steering control means Us of the embodiments corresponds to the electrically operated device control means of the present invention.

The above-mentioned object, other objects, characteristics, and advantages of the present invention will become apparent from an explanation of preferred embodiments that will be described in detail below with reference to the attached drawings.

DESCRIPTION OF THE PRESENT EMBODIMENTS

Figure 1:
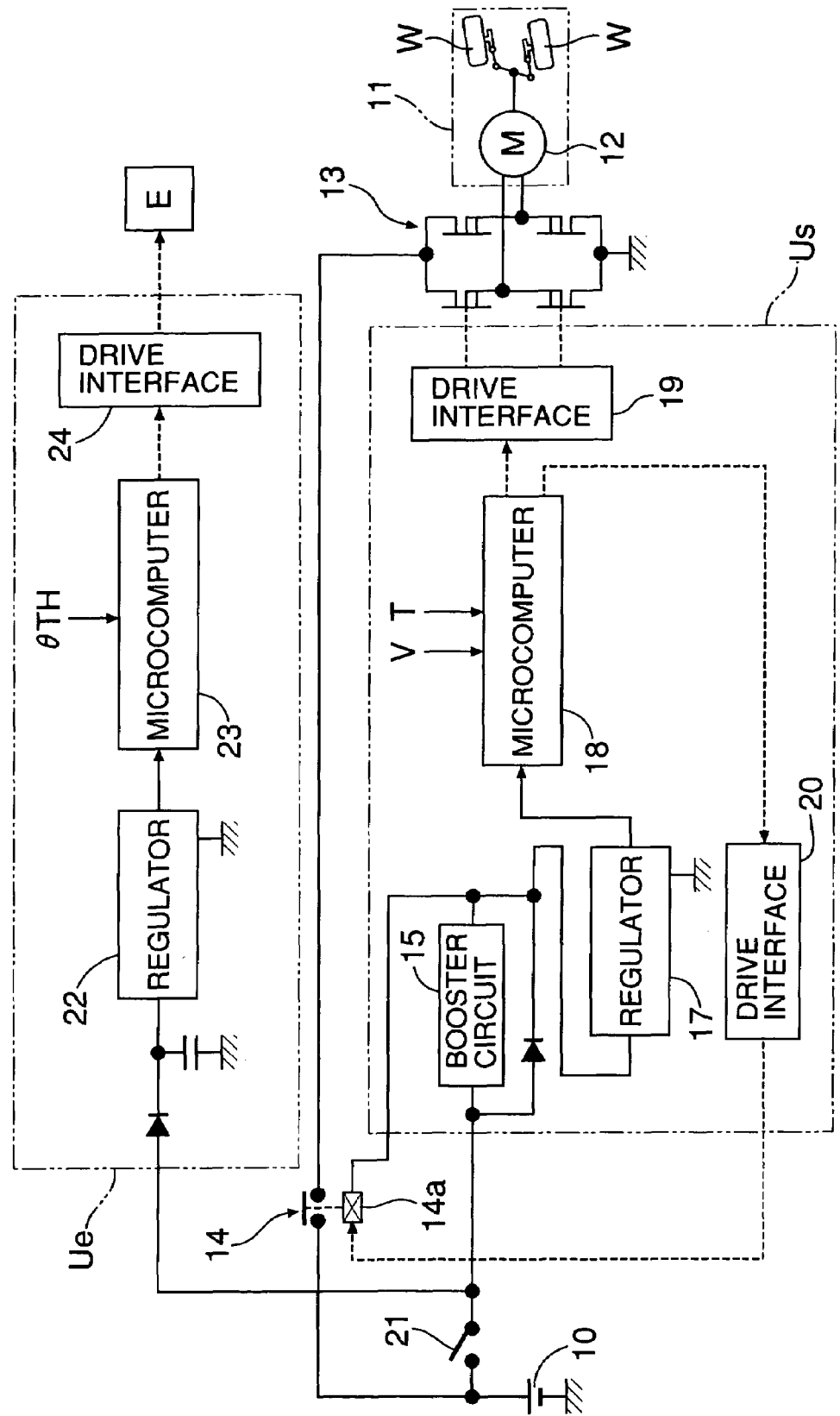
FIG. 1 is a block diagram of an SBW steering system and an engine control system according to a first embodiment of the invention.

The first embodiment of the present invention is explained below with reference to FIG. 1.

Steering control means Us employs a vehicle-mounted 12V battery 10 as a power source and controls the operation of an electric motor 12 of a steer-by-wire steering system 11 so as to turn wheels W. A normally open relay 14 is disposed between the battery 10 and an H bridge circuit 13 for pulse width modulation (PWM) control of the electric motor 12. The steering control means Us, which controls the H bridge circuit 13 and the relay 14, includes a booster circuit 15 for boosting the voltage of the battery 10 by a predetermined value (2V in the embodiment), a regulator 17 that regulates the voltage boosted by the booster circuit 15 at a predetermined voltage (e.g., 5V to 3.3V), a microcomputer 18 that is operated by electric power supplied from the regulator 17, a drive interface 19 that is connected to the microcomputer 18 and controls the operation of the H bridge circuit 13, and a drive interface 20 that is connected to the microcomputer 18 and controls the operation of the relay 14. An ignition switch 21 is disposed between the battery 10 and the steering control means Us. When the ignition switch 21 is turned ON, operation of the steering control means Us is started. The minimum operating voltage of the steering control means Us is set at 6V in the embodiment.

Engine control means Ue, to which electricity is supplied from the battery 10 by turning the ignition switch 21 ON, includes a regulator 22 that regulates the battery voltage at a predetermined voltage (e.g., 5V), a microcomputer 23 that is operated by electric power supplied from the regulator 22, and a drive interface 24 that is connected to the microcomputer 23 and controls the operation of an electronic fuel injection valve of the engine E. The minimum operating voltage of the engine control means Ue is set at 6V in the embodiment.

The operation of the first embodiment having the above-mentioned arrangement is now explained.

When the ignition switch 21 is turned ON, the battery 10 is connected to the steering control means Us, and the microcomputer 18 operates. When the microcomputer 18 outputs an ON command signal to the relay 14 via the drive interface 20, the relay coil 14a is energized so as to turn the relay 14 ON, and the H bridge circuit 13 is connected to the battery 10. The microcomputer 18 carries out PWM control of the electric motor 12 of the steer-by-wire steering system 11 via the drive interface 19 based on a vehicle speed V and a steering torque T that is input to the steering wheel by the driver, and as a result a turning angle of the wheels W corresponding to the operation of the steering wheel can be obtained.

When the ignition switch 21 is turned ON, the engine control means Ue is connected to the battery 10, and a voltage of 5V obtained by regulating the battery voltage by the regulator 22 is applied to the microcomputer 23. The microcomputer 23 controls the amount of fuel injected by the electronic fuel injection valve of the engine E via the drive interface 24 based on, for example, the degree of throttle opening θTH.

Since the battery 10 normally has a voltage of about 12V, the steering control means Us and the engine control means Ue, whose minimum operating voltages are both 6V, can be operated without problem, but there are circumstances due to, for example, a malfunction of an AC generator, etc., in which the voltage of the battery 10 gradually decreases from 12V. When the voltage of the battery 10 decreases to 6V which is the minimum operating voltage, if the steering control means Us stops functioning prior to the engine control means Ue, there is a possibility that the steering function of the wheels W might not be sufficiently exhibited while the vehicle travels by means of the engine E.

However, in the present embodiment, because the booster circuit 15 provided in the steering control means Us increases the battery voltage by 2V, a voltage of 6V, which is the minimum operating voltage, can be applied to the regulator 17 until the battery voltage decreases to 4V, that is, even when the engine control means Ue stops functioning due to the decrease in voltage, the function of the steering control means Us can be maintained for a while. In particular, because the engine control means Ue stops functioning, the load of the battery 10 is reduced by the amount of electric power that would have been consumed by the engine control means Ue, and the function of the steering control means Us can be maintained for a longer period of time.

In this way, when the battery voltage decreases, the function of the engine control means Ue is stopped prior to the function of the steering control means Us being stopped, and supply of fuel to the engine E is thus cut off before the function of steering the wheels W by the steering control means Us is inhibited, thereby forcing the vehicle to stop and ensuring the safety of the vehicle.

Figure 2:
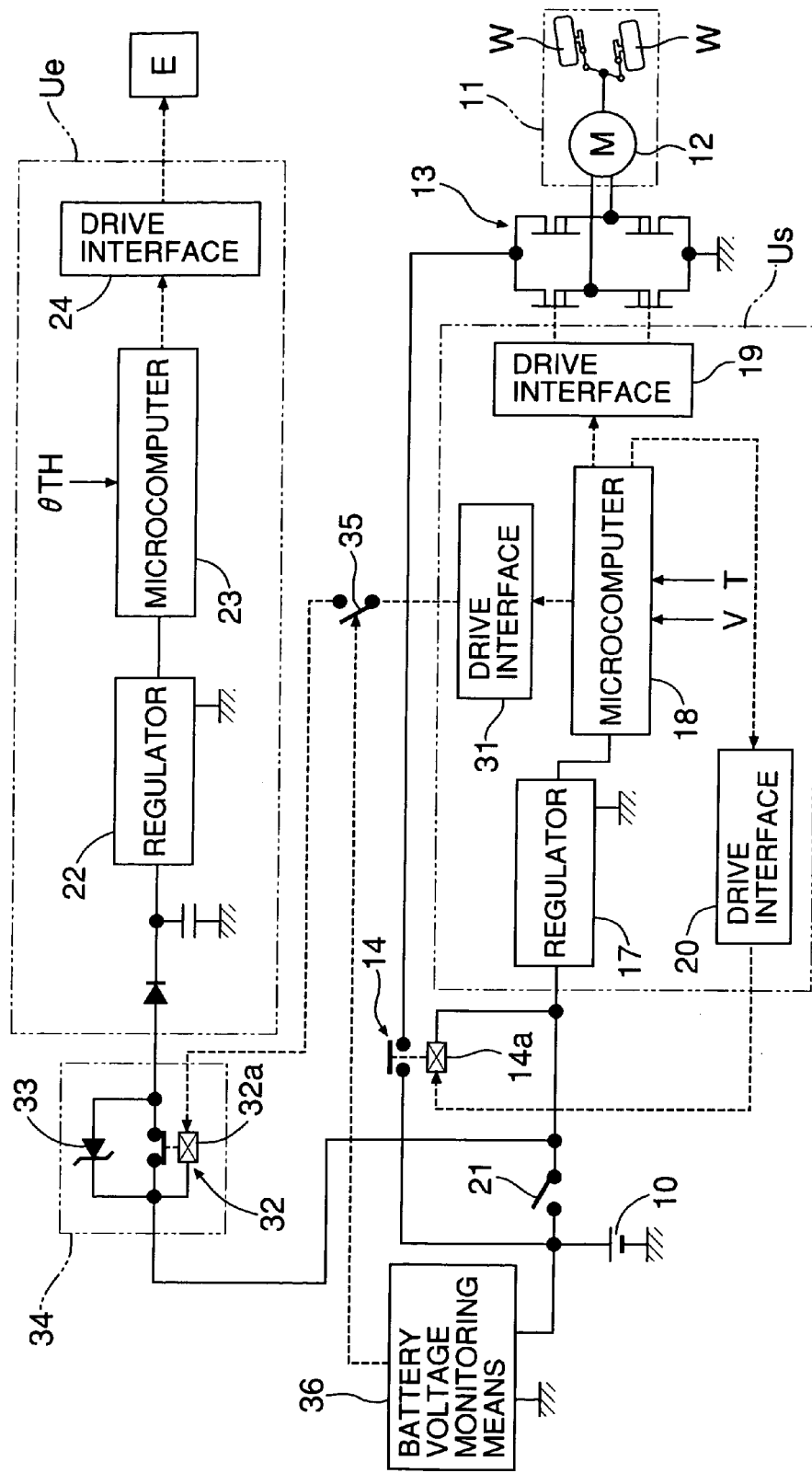
FIG. 2 is a block diagram of an SBW steering system and an engine control system according to a second embodiment of the invention.

A second embodiment of the present invention is now explained with reference to FIG. 2. In the second embodiment, elements corresponding to those of the first embodiment are denoted by the same reference numerals and symbols as in the first embodiment, and their explanation is omitted.

Steering control means Us of the second embodiment includes, instead of the booster circuit 15, a drive interface 31 connected to a microcomputer 18. In the second embodiment, minimum operating voltage increasing means 34 including a normally closed relay 32 and a zener diode 33 connected in parallel to the relay 32, is connected between a battery 10 and engine control means Ue, and a relay control switch 35 is connected between the drive interface 31 and a relay coil 32a. The breakdown voltage of the zener diode 33 is set at 2V in the embodiment. The relay control switch 35 is turned ON and OFF by a signal from battery voltage monitoring means 36 for monitoring the voltage of the battery 10.

When the battery voltage monitored by the battery voltage monitoring means 36 is normal, the relay control switch 35 is OFF, and thus the normally closed relay 32 of the minimum operating voltage increasing means 34 of the engine control means Ue is ON, so that the battery voltage is applied to the regulator 22 of the engine control means Ue as it is. The operation of the second embodiment in this state is the same as that of the first embodiment described above.

If, for example, the voltage of the battery 10 gradually decreases from 12V to close to 8V due to a malfunction of an AC generator, etc., the relay control switch 35 is turned ON by a signal from the battery voltage monitoring means 36, and the relay 32 of the minimum operating voltage increasing means 34 of the engine control means Ue is turned OFF. As a result, the battery 10 and the regulator 22 are connected to each other via the zener diode 33, and a voltage that is lower than the battery voltage by 2V which is the breakdown voltage of the zener diode 33, is applied to the regulator 22. Hence, when the battery voltage decreases to 8V, the voltage applied to the regulator 22 decreases to 6V which is the minimum operating voltage of the engine control means Ue, supply of fuel to the engine E is forcibly cut off, and the vehicle stops.

During this process, because a battery voltage of 8V, which is higher than 6V that is the minimum operating voltage of the steering control means Us, is applied to the steering control means Us, even when the engine control means Ue stops functioning due to the voltage decreasing, the function of the steering control means Us can be maintained for a while. In particular, because the engine control means Ue stops functioning, the load of the battery 10 is reduced by the amount of electric power that would have been consumed by the engine control means Ue, so that the function of the steering control means Us can be maintained for a long period of time.

Figure 3:
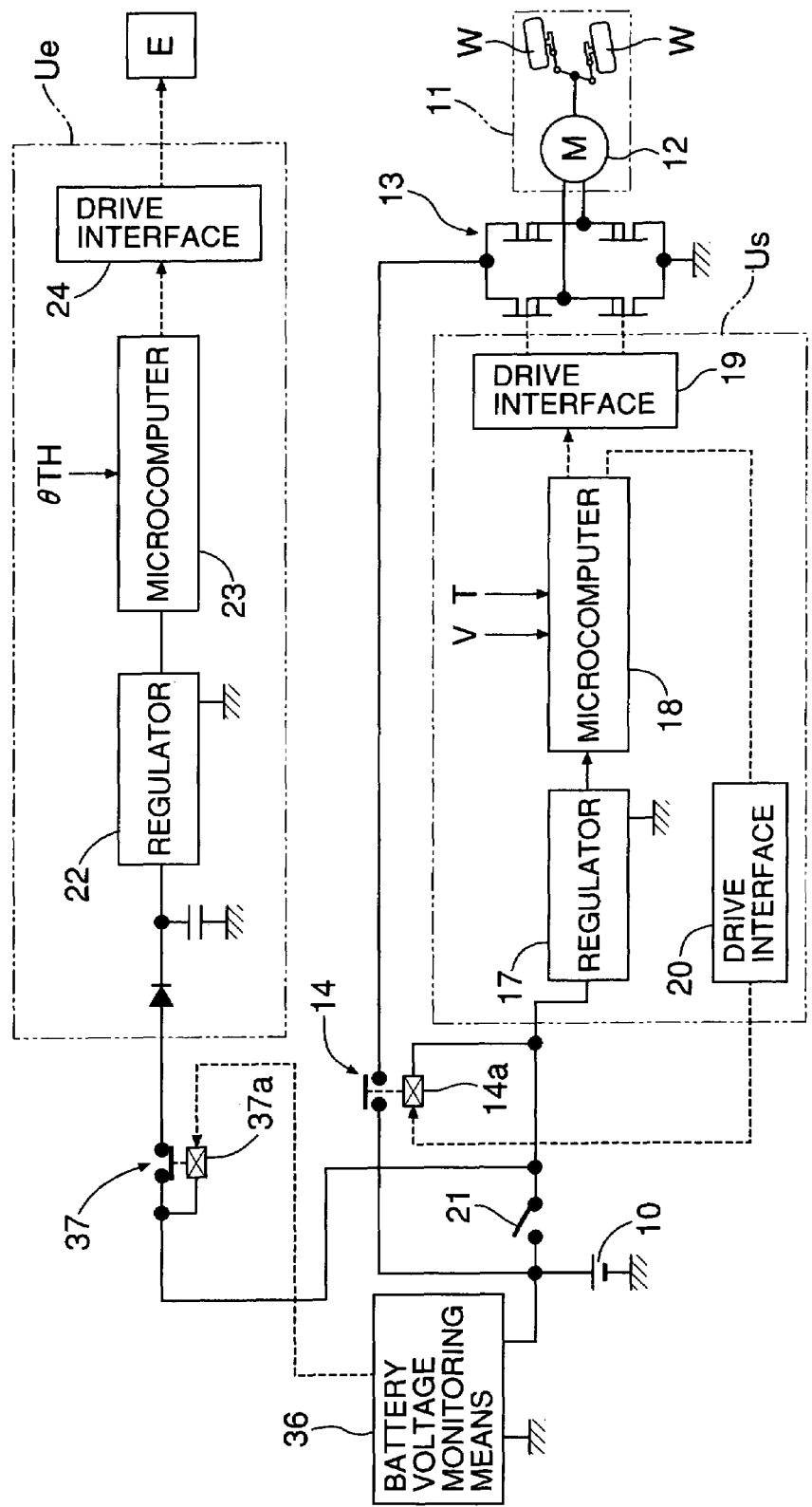
FIG. 3 is a block diagram of an SBW steering system and an engine control system according to a third embodiment of the invention.

A third embodiment of the present invention is now explained with reference to FIG. 3. In the third embodiment, elements corresponding to those of the second embodiment are denoted by the same reference numerals and symbols as in the second embodiment, and their explanation is omitted.

The third embodiment, which is a modification of the second embodiment, includes a normally closed relay 37 instead of the minimum operating voltage increasing means 34 of the second embodiment, and this relay 37 is turned OFF by a signal from battery voltage monitoring means 36.

When the battery voltage monitored by the battery voltage monitoring means 36 decreases and approaches 6V which is the minimum operating voltage of steering control means Us and engine control means Ue, the relay 37 is turned OFF by a signal from the battery voltage monitoring means 36, and supply of electricity to the engine control means Ue is cut off. As a result, the operation of the engine control means Ue is stopped prior to the operation of the steering control means Us being stopped, and it is possible to cut off the supply of fuel to the engine E so as to stop the vehicle while the function of the steering control means Us is maintained.

Hence, in accordance with this third embodiment, the same effects as in the first and second embodiments can be achieved.

Although embodiments of the present invention are explained above, the present invention can be modified in a variety of ways without departing from the spirit and scope thereof.

For example, in the embodiments, the minimum operating voltage of the steering control means Us coincides with the minimum operating voltage of the engine control means Ue, but it is not necessary for them to be identical to each other.

Furthermore, in the embodiments, the engine control means Ue controls the fuel injection to the engine E, but it may instead, for example, control ignition of the engine E. That is, the invention is not limited to the control means of the disclosed embodiments, but may use other control means as long as the engine E can be stopped.

It is also possible to obtain the same effects as in the present invention if the minimum operating voltage of the steering control means Us is reduced by employing low voltage components for the regulator 17 and the microcomputer 18 of the steering control means Us, by making the relay 14 of the steering control means Us a semiconductor relay, or by providing an internal power source in the steering control means Us.

Moreover, in the embodiments, explanation is given to the arrangement where the engine E is stopped by hardware, but the present invention is applicable to an arrangement where the engine E is stopped by software employing CAN communication, etc., which has become common practice in automobiles in recent years.

Furthermore, the critical system in the present invention is not limited to the steer-by-wire steering system 11 of the embodiments, and can be applied to any other system that is critical for vehicle safety, such as a brake-by-wire system in which a brake is operated by an electric motor.

What is claimed is:

1. A vehicle control system comprising:
    a battery mounted in a vehicle;
    an electrically operated device that is operated by electric power supplied from the battery and drives a critical system of the vehicle;
    an electrically operated device controller which controls the operation of the electrically operated device;
    an engine controller which controls, by electric power supplied from the battery, the operation of an engine for making the vehicle travel; and
    a booster circuit that boosts the voltage applied to the electrically operated device controller so that, when the voltage of the battery decreases, the voltage applied to the engine controller falls below a minimum operating voltage of the engine controller before the voltage applied to the electrically operated device controller falls below a minimum operating voltage of the electrically operated device controller.

2. The vehicle control system of claim 1 wherein the critical system comprises a steer-by-wire steering system, and wherein the electrically operated device comprises an electric motor.

3. The vehicle control system of claim 1 wherein:
    the vehicle control system further comprises a relay capable of selective electronic communication with other components of the system;
    the electrically operated device controller comprises a first microcomputer, a first regulator for regulating voltage to the first microcomputer from the battery, a first drive interface that allows the first microcomputer to interface with the electrically operated device, and a second drive interface that allows the first microcomputer to interface with the relay;
    the engine controller comprises a second regulator for regulating voltage from the battery, a second microcomputer, a third drive interface that allows the second microcomputer to interface with the engine, wherein the third drive interface, second microprocessor and engine are operatively connectable for selective electronic communication therebetween.

4. The vehicle control system of claim 1, wherein the electrically operated device controller drives an actuator of the critical system.

5. A vehicle control system comprising:
a battery mounted in a vehicle;
an electrically operated device that is operated by electric power supplied from the battery and drives a critical system of the vehicle;
an electrically operated device controller which controls the operation of the electrically operated device;
an engine controller which controls, by electric power supplied from the battery, the operation of an engine for making the vehicle travel; and
means for ensuring that said engine controller stops operation of the engine before said electrically operated device controller becomes inoperable due to a decrease in voltage supplied from said battery;
wherein said ensuring means comprises a minimum operating voltage increasing means that makes a minimum operating voltage of the engine controller higher than a minimum operating voltage of the electrically operated device controller after the engine controller has started.

6. The vehicle control system of claim 5 wherein the critical system comprises a steer-by-wire steering system, and wherein the electrically operated device comprises an electric motor.

7. The vehicle control system of claim 5 further including a battery voltage monitor, and when monitored battery voltage is normal, said minimum operating voltage increasing means does not make the minimum operating voltage of the engine controller higher than the minimum operating voltage of the electrically operated device controller.

8. The vehicle control system of claim 5 wherein:
the vehicle control system further comprises a relay;
the electrically operated device controller comprises a first microcomputer, a first regulator for regulating voltage to the first microcomputer from the battery, a first drive interface that allows the first microcomputer to interface with the electrically operated device, and a second drive interface that allows the first microcomputer to interface with the relay;
the engine controller comprises a second regulator for regulating voltage from the battery, a second microcomputer, a third drive interface that allows the second microcomputer to interface with the engine.

9. A vehicle control system comprising:
a battery mounted in a vehicle;
an electrically operated device that is operated by electric power supplied from the battery and drives a critical system of the vehicle;
an electrically operated device controller which controls the operation of the electrically operated device;
an engine controller for controlling, by electric power supplied from the battery, the operation of an engine for making the vehicle travel; and
means for ensuring that said engine controller stops operation of the engine before said electrically operated device controller becomes inoperable due to a decrease in voltage supplied from said battery;
wherein said ensuring means comprises a battery voltage monitoring means for monitoring the voltage of the battery, and the battery voltage monitoring means stops the supply of electricity to the engine controller when the voltage of the battery decreases below a predetermined level.

10. The vehicle control system of claim 9 wherein the critical system comprises a steer-by-wire steering system, and wherein the electrically operated device comprises an electric motor.

11. The vehicle control system of claim 9, wherein:
the vehicle control system further comprises a relay;
the electrically operated device controller comprises a first microcomputer, a first regulator for regulating voltage to the first microcomputer from the battery, a first drive interface that allows the first microcomputer to interface with the electrically operated device, and a second drive interface that allows the first microcomputer to interface with the relay;
the engine controller comprises a second regulator for regulating voltage from the battery, a second microcomputer, a third drive interface that allows the second microcomputer to interface with the engine.

12. A vehicle control system comprising:
a battery mounted in a vehicle;
an electrically operated device that is operated by electric power supplied from the battery and drives a critical system of the vehicle;
an electrically operated device controller for controlling the operation of the electrically operated device;
an engine controller for controlling, by electric power supplied from the battery, the operation of an engine for making the vehicle travel; and
means for ensuring that said engine controller stops operation of the engine before said electrically operated device controller becomes inoperable due to a decrease in voltage supplied from said battery.

13. The vehicle control system of claim 12 wherein said ensuring means comprises a booster circuit that boosts the voltage applied to the electrically operated device controller so that, when the voltage of the battery decreases, the voltage applied to the engine controller falls below a minimum operating voltage of the engine controller before the voltage applied to the electrically operated device controller falls below a minimum operating voltage of the electrically operated device controller.

14. The vehicle control system of claim 12 wherein said ensuring means comprises a minimum operating voltage increasing means that makes a minimum operating voltage of the engine controller higher than a minimum operating voltage of the electrically operated device controller after the engine controller has started.

15. The vehicle control system of claim 12 wherein said ensuring means comprises a battery voltage monitoring means for monitoring the voltage of the battery, and the battery voltage monitoring means stops the supply of electricity to the engine controller when the voltage of the battery decreases below a predetermined level.

16. The vehicle control system of claim 13, wherein said ensuring means comprises at least one component selected from the group consisting of:
a booster circuit for boosting voltage applied to the electrically operated device controller,
minimum operating voltage increasing means, and
battery voltage monitoring means.

17. The vehicle control system of claim 12, wherein the electrically operated device controller drives an actuator of the critical system, and wherein the ensuring means comprises a booster circuit that is operable to increase voltage supplied to the electrically operated device controller.

* * * * *